(12) United States Patent
Motohara

(10) Patent No.: US 8,857,029 B2
(45) Date of Patent: Oct. 14, 2014

(54) MOUNTING APPARATUS AND MOUNTING METHOD

(75) Inventor: Hiroyuki Motohara, Hachioji (JP)

(73) Assignee: Olympus Corporation, Tokyo (JP)

( * ) Notice: Subject to any disclaimer, the term of this patent is extended or adjusted under 35 U.S.C. 154(b) by 443 days.

(21) Appl. No.: 13/009,050

(22) Filed: Jan. 19, 2011

(65) Prior Publication Data
US 2011/0173793 A1 Jul. 21, 2011

(30) Foreign Application Priority Data

Jan. 21, 2010 (JP) ................................ 2010-011399

(51) Int. Cl.
*B23P 21/00* (2006.01)
*B23Q 17/00* (2006.01)
*G02B 27/62* (2006.01)
*G02B 6/42* (2006.01)
*G02B 6/32* (2006.01)

(52) U.S. Cl.
CPC ............... *G02B 27/62* (2013.01); *G02B 6/4226* (2013.01); *G02B 6/32* (2013.01); *G02B 6/4227* (2013.01); *G02B 6/4219* (2013.01); *G02B 6/422* (2013.01); *G02B 6/4221* (2013.01); *G02B 6/4222* (2013.01)
USPC .......... 29/407.04; 29/720; 29/714; 29/407.09; 29/407.1

(58) Field of Classification Search
CPC .... G02B 6/32; G02B 6/02042; G02B 6/2551; G02B 6/4219; G02B 6/422; G02B 6/4221; G02B 6/4222; G02B 6/4226; G02B 6/4227
USPC ............ 29/407.01, 407.04, 407.09, 701, 702, 29/703, 714, 720, 407.1
See application file for complete search history.

(56) References Cited

U.S. PATENT DOCUMENTS 5,383,118 A * 1/1995 Nguyen ........................ 700/59
5,590,456 A * 1/1997 Armington et al. ............. 29/721
(Continued)

FOREIGN PATENT DOCUMENTS

JP 07-273497 10/1995
JP 08298625 A 11/1996
(Continued)

OTHER PUBLICATIONS

Japanese Office Action dated Dec. 3, 2013 issued in corresponding JP 2010-011399 together with an English language translation.

*Primary Examiner* — Essama Omgba
(74) *Attorney, Agent, or Firm* — Scully, Scott, Murphy & Presser, PC

(57) ABSTRACT

A mounting apparatus includes a substrate; an optical component having a first surface on which light from the substrate is incident and a second surface from which the incident light goes out after the incident light is refracted; an adjustment unit that adjusts a position of the substrate and a position of the optical component by moving the substrate and the optical component relatively with the first surface of the optical component and the substrate being opposed to each other; an imaging unit that is arranged in an optical path of the light that goes out from the second surface; and a control unit that controls an amount by which the adjustment unit moves the substrate and the optical component relatively according to image data which is captured by the imaging unit, and that mounts the optical component on the substrate.

8 Claims, 9 Drawing Sheets

(56) References Cited

U.S. PATENT DOCUMENTS

| | | | |
|---|---|---|---|
| 5,621,831 A * | 4/1997 | Staver et al. | 385/33 |
| 5,680,698 A * | 10/1997 | Armington et al. | 29/833 |
| 5,768,759 A * | 6/1998 | Hudson | 29/407.04 |
| 5,862,283 A * | 1/1999 | Trott et al. | 385/88 |
| 5,999,269 A * | 12/1999 | Haugsjaa et al. | 356/401 |
| 6,023,339 A * | 2/2000 | Haugsjaa et al. | 356/401 |
| 6,453,090 B1 * | 9/2002 | Conde et al. | 385/33 |
| 6,718,233 B2 * | 4/2004 | Sakhitab et al. | 700/259 |
| 7,031,575 B2 * | 4/2006 | Blauvelt et al. | 385/39 |
| 7,185,422 B2 * | 3/2007 | Sakai et al. | 29/832 |
| 7,298,466 B2 * | 11/2007 | Biet et al. | 356/138 |
| 7,302,142 B2 * | 11/2007 | Conde et al. | 385/49 |
| 7,366,379 B2 * | 4/2008 | Blauvelt et al. | 385/41 |
| 7,616,845 B2 * | 11/2009 | Matsuoka et al. | 385/14 |
| 7,991,290 B2 * | 8/2011 | Tanaka et al. | 398/86 |
| 8,194,182 B2 * | 6/2012 | Kinoshita | 348/374 |
| 2003/0187548 A1 * | 10/2003 | Sakhitab et al. | 700/259 |
| 2004/0263806 A1 * | 12/2004 | Silverstein et al. | 353/119 |
| 2005/0060883 A1 * | 3/2005 | Sakai et al. | 29/833 |
| 2005/0078913 A1 * | 4/2005 | Blauvelt et al. | 385/39 |
| 2005/0219553 A1 * | 10/2005 | Kelly et al. | 356/605 |
| 2006/0209297 A1 * | 9/2006 | Biet et al. | 356/153 |
| 2006/0275017 A1 * | 12/2006 | Sulik et al. | 385/147 |
| 2007/0146881 A1 * | 6/2007 | Tanaka et al. | 359/487 |
| 2007/0237450 A1 * | 10/2007 | Blauvelt et al. | 385/14 |
| 2008/0285914 A1 * | 11/2008 | Matsuoka et al. | 385/24 |
| 2010/0053394 A1 * | 3/2010 | Kinoshita | 348/294 |
| 2010/0132187 A1 * | 6/2010 | Nishino et al. | 29/739 |
| 2010/0325884 A1 * | 12/2010 | Nishino et al. | 29/833 |
| 2011/0273718 A1 * | 11/2011 | Bouma et al. | 356/446 |
| 2012/0133994 A1 * | 5/2012 | Yamasaki et al. | 358/296 |
| 2013/0215427 A1 * | 8/2013 | Bouma et al. | 356/446 |

FOREIGN PATENT DOCUMENTS

| | | | | |
|---|---|---|---|---|
| JP | 11354769 A | | 12/1999 | |
| JP | 2001159727 A | | 6/2001 | |
| JP | 2004079788 A | * | 3/2004 | G03F 7/20 |
| JP | 2007273696 A | | 10/2007 | |
| JP | 2007334049 A | | 12/2007 | |
| JP | 2011009655 A | * | 1/2011 | H05K 13/04 |
| WO | WO 9839265 A1 | * | 9/1998 | C03C 27/02 |
| WO | WO 2004044622 A3 | * | 11/2004 | G02B 6/26 |

* cited by examiner

FIG. 12
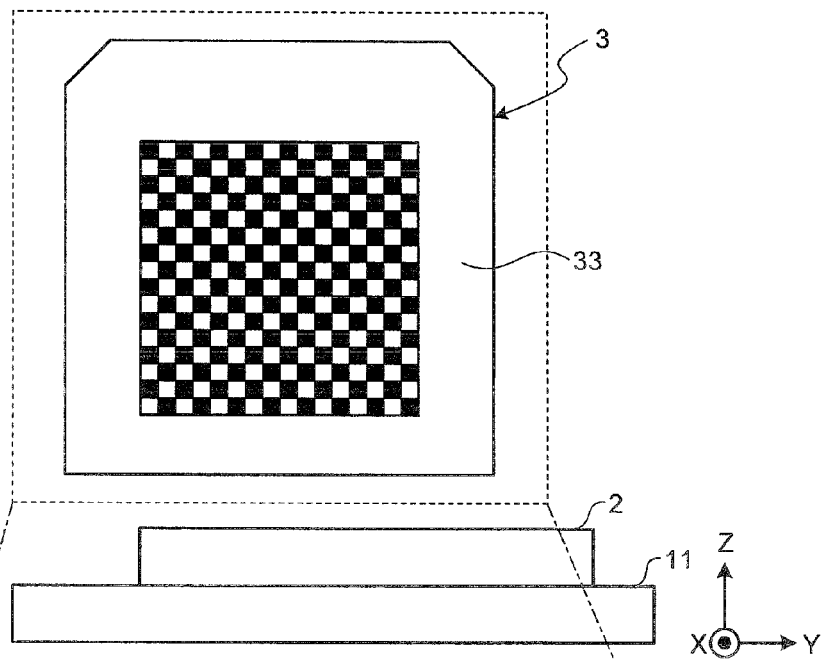
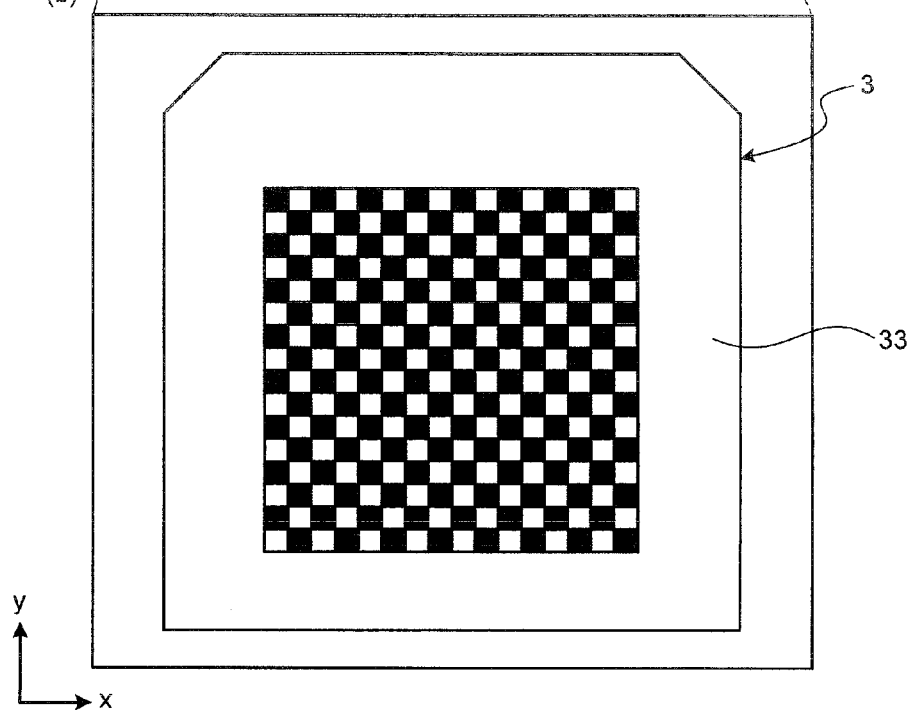

MOUNTING APPARATUS AND MOUNTING METHOD

CROSS-REFERENCE TO RELATED APPLICATIONS

This application is based upon and claims the benefit of priority from Japanese Patent Application No. 2010-011399, filed on Jan. 21, 2010, the entire contents of which are incorporated herein by reference.

BACKGROUND OF THE INVENTION

1. Field of the Invention

The present invention relates to a mounting apparatus and a mounting method for mounting an optical component, which refracts incident light and then emits the incident light, on a substrate.

2. Description of the Related Art

A known method of mounting an electronic component on a transparent substrate (transparent panel) recognizes the relative positions of a positioning mark of the transparent panel and a positioning mark of the electric component from the surface opposite to the mounting surface of the transparent panel (see Japanese Laid-open Patent Publication No. 7-273497, for example).

For example, there is a case in which a transparent optical component, such as a prism, that refracts incident light and then send outs the incident light is mounted on a substrate. However, in some cases, when such an optical component is mounted on a substrate, one surface of the optical component opposite to another surface facing the substrate does not transmit light and thus positioning marks on the optical component and the substrate cannot be recognized from the opposite surface.

SUMMARY OF THE INVENTION

A mounting apparatus according to an aspect of the present invention includes a substrate; an optical component having a first surface on which light from the substrate is incident and a second surface from which the incident light goes out after the incident light is refracted; an adjustment unit that adjusts a position of the substrate and a position of the optical component by moving the substrate and the optical component relatively with the first surface of the optical component and the substrate being opposed to each other; an imaging unit that is arranged in an optical path of the light that goes out from the second surface; and a control unit that controls an amount by which the adjustment unit moves the substrate and the optical component relatively according to image data which is captured by the imaging unit, and that mounts the optical component on the substrate.

A mounting method according to another aspect of the present invention includes arranging a substrate and a first surface on which light from the substrate is incident so that the substrate and the first surface are opposed to each other, the first surface being of an optical component having a second surface from which the incident light goes out after the incident light is refracted; illuminating the second surface with illumination light; capturing image data of the second surface; controlling, according to the captured image data, an amount by which the substrate and the optical component are moved relatively to adjust a position of the substrate and a position of the optical component; and mounting the optical component whose position has been adjusted on the substrate.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is an illustration diagram illustrating the relation between a coordinate system of a stage and a coordinate system of a camera that captures an image of a prim from the side of a light incident surface of the prism.

DETAILED DESCRIPTION OF THE PREFERRED EMBODIMENTS

Figure 1:
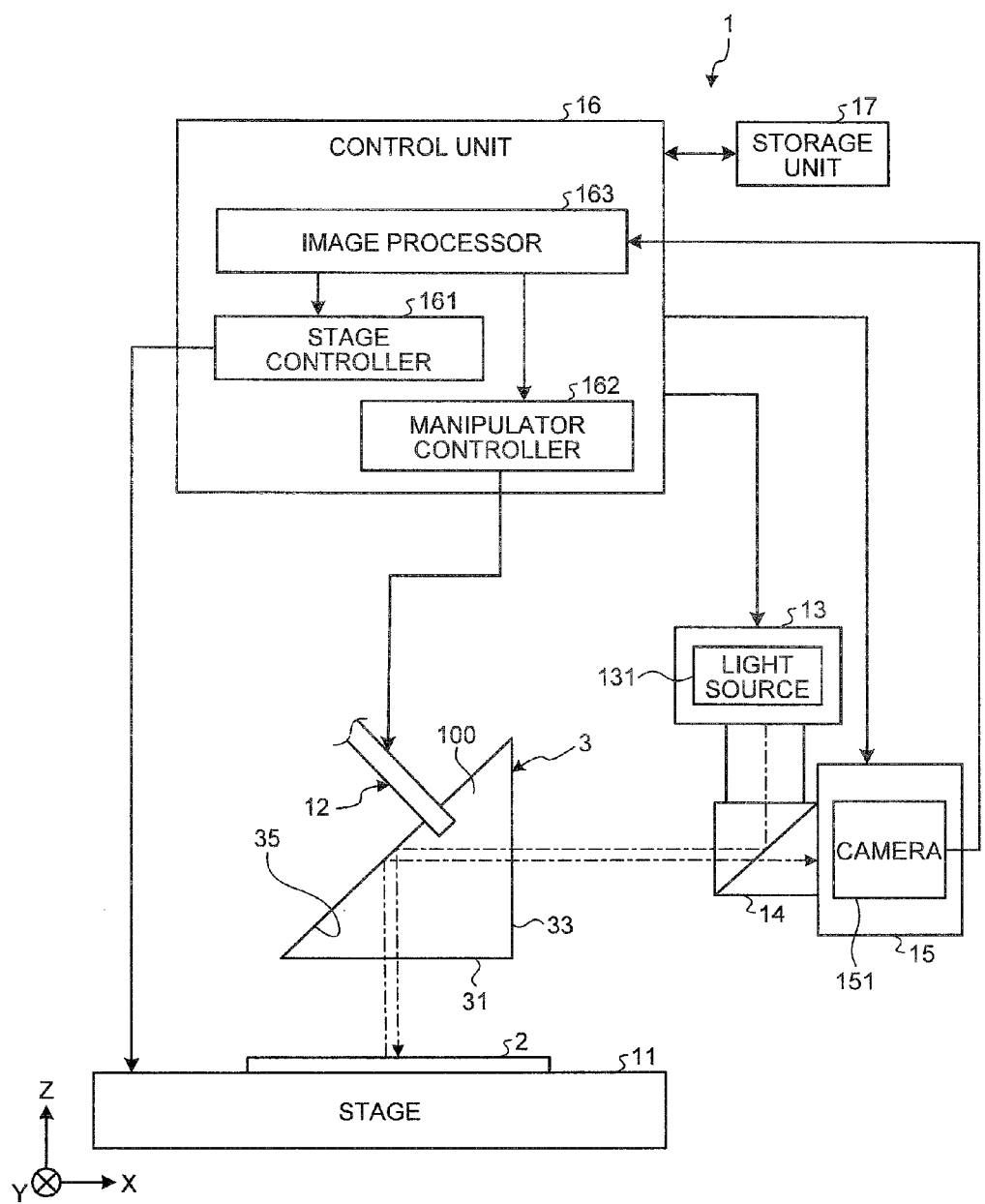
FIG. 1 is a schematic diagram illustrating an overall configuration of a mounting apparatus of a first embodiment of the present invention.

Preferred embodiments of a mounting apparatus according to the present invention will be described below with reference to the accompanying drawings. The invention is not limited to the embodiments. Referring to the drawings, like reference numerals indicate like parts throughout the views.

First Embodiment

In a first embodiment of the present invention, a prism is illustrated as an optical component that refracts incident light and then sends out the incident light. A mounting apparatus that mounts the prism on a substrate that is provided with an alignment mark is illustrated as well. FIG. 1 is a schematic diagram illustrating an overall configuration of a mounting apparatus 1 according to the first embodiment. As depicted in FIG. 1, the mounting apparatus 1 includes a stage 11 on which a substrate 2 is mounted; a manipulator 12 that transfers a prism 3, an example of an optical component, that is mounted on the substrate 2; a light source unit 13; an optical path splitter 14; and an imaging unit 15.

The prism 3 that is held by the manipulator 12 is mounted on the substrate 2 later. Light from the side of the substrate 2 is incident on the prism 3. The prism 3 includes a first surface (hereinafter, "light going-out surface") 31 that serves as a surface from which light incident from the light source unit is sent out; a second surface (hereinafter, "light incident surface") 33 that serves as a surface on which the light from the light source unit 13 is incident; and a reflecting surface 35 that reflects the incident light. In the first embodiment, the stage 11 and the manipulator 12 cooperatively function as an adjustment unit. The stage 11 and the manipulator 12 keep the substrate 2 and the light going-out surface 31 separated from each other and opposed to each other. In this state, the stage 11 and the manipulator 12 move the substrate 2 and the prism 3 relatively.

Specifically, the stage 11 is configured to be movable in an X-axis direction and in a Y-axis direction by a drive unit, such as a motor, and is configured to be rotatable on a Z axis on the X-Y plane. The stage 11 is controlled by a stage controller 161 to described below to position a mounting target position (an alignment mark 21 in FIG. 2 in the first embodiment to be described below) for mounting the prism 3, which is a position set in the top surface of the substrate 2 on the stage 11, beneath the light going-out surface 31 of the prism 3 that is held by the manipulator 12. Thereafter, the stage 11 adjusts the position of the substrate 2 with respect to that of the prism 3 by moving and/or rotating the substrate 2 on the X-Y plane under the control of the stage controller 161 and aligns the substrate 2 and the prism 3.

The manipulator 12 is used to mount the prism 3 on the substrate 2. Under the control of a manipulator controller 162 as described below, the manipulator 12 holds the reflecting surface 35 of a side surface 100 of the prism 3 such that the light going-out surface 31 of the prism 3 is parallel to the stage 11 (the substrate 2) and moves the prism 3 that the manipulator 12 holds in a Z-axis direction.

The light source unit 13 includes a light source 131 that illuminates the light incident surface 33 of the prism 3 with illumination light. The light source unit 13 also includes a light amount adjustment device (not shown) that adjusts the amount of light emitted from the light source 131. The amount of illumination light emitted from the light source 131 is adjusted to a predetermined amount by the light amount adjustment device. The light source unit 13 emits the predetermined amount of illumination light, adjusted as described above, and the illumination light is then incident on the optical path splitter 14.

The optical path splitter 14 includes, for example, a half mirror. The optical path splitter 14 reflects the illumination light, which is emitted from the light source unit 13, to the side of the light incident surface 33 of the prism 3. The illumination light that is reflected by the optical path splitter 14 is incident on the substrate 2 via the prism 3. The optical path splitter 14 also transmits the reflection light, which is reflected by the substrate 2 and then is incident on the optical path splitter 14 via the prism 3 as described below, allowing the reflection light to be incident on the imaging unit 15.

The imaging unit 15 includes a camera 151 that includes, for example, an imaging device, such as a CCD or a CMOS. The imaging unit 15 outputs image data that is captured by the camera 151 to an image processor 163 to be described below. The imaging unit 15 includes a camera position adjustment device (not shown) that moves the camera 151 along the optical axis direction (the X-axis direction). The camera 151 is arranged on a lateral side with respect to the light incident surface 33 of the prism 3, which is held by the manipulator 12 and transferred to be above the mounting target position (the alignment mark 21) on the substrate 2. More specifically, the camera 151 is arranged in the optical path of light that is refracted by the optical prism 3 with the position of the camera 151 being set beforehand such that the optical axis of the camera 151 is identical with that of the light source 131 that constitutes the light source unit 13. The camera 151 captures an image of the prism 3 from the side of the light incident surface 33 in a state in which the camera 151 is positioned in a predetermined X position by the camera position adjustment device.

The mounting apparatus 1 includes a control unit 16 that is housed in an appropriate part of the apparatus. The control unit 16 includes, for example, a microcomputer. The control unit 16 controls the mounting apparatus 1 by controlling operations of the units constituting the mounting apparatus 1. The control unit 16 is connected to a storage unit 17 for recording data, such as various setting values necessary for operations of the mounting apparatus 1, or loading image data captured by the camera 151 of the imaging unit 15. The storage unit 17 is realized by properly combining various IC memories, such as a flash memory, that can be updated, a hard disk that is a built-in or establishes connections using a data communication terminal, an information storage medium, such as a CD-ROM, and a reading device corresponding to the information storage medium. The control unit 16 includes the stage controller 161, the manipulator controller 162, and the image processor 163 serving as a substrate recognition unit and an optical component recognition unit.

The stage controller 161 controls movement of the stage 11 to move the stage 11 to a predetermined position on the X-Y plane and controls rotation of the stage 11 to rotate the stage 11 on the Z axis at a predetermine rotation angle. The manipulator controller 162 controls driving the manipulator 12. The manipulator controller 162 causes the manipulator 12 to hold the side surface 100 of the prism 3 and moves the manipulator 12 in the Z-axis direction. The image processor 163 performs an image recognition process, such as pattern recognition, on the image data that is input from the camera 151 of the imaging unit 15. The image processor 163 recognizes the image of the substrate 2 on the image data and the outline (edge) of the light incident surface 33 of the prism 3.

Figure 2:
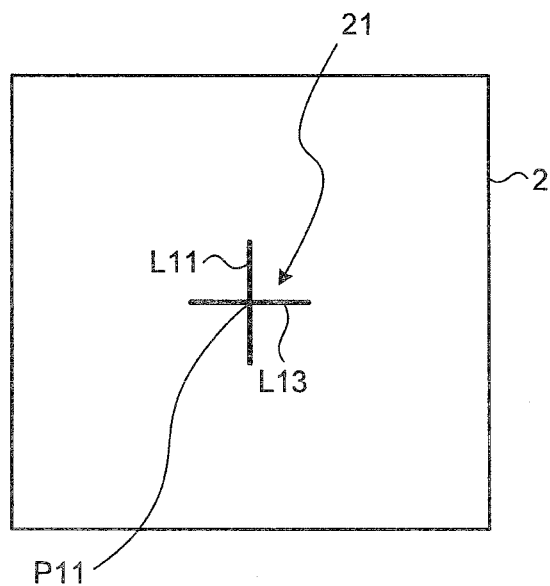
FIG. 2 is a plane view of a substrate that is placed on a stage in the first embodiment.
Figure 3:
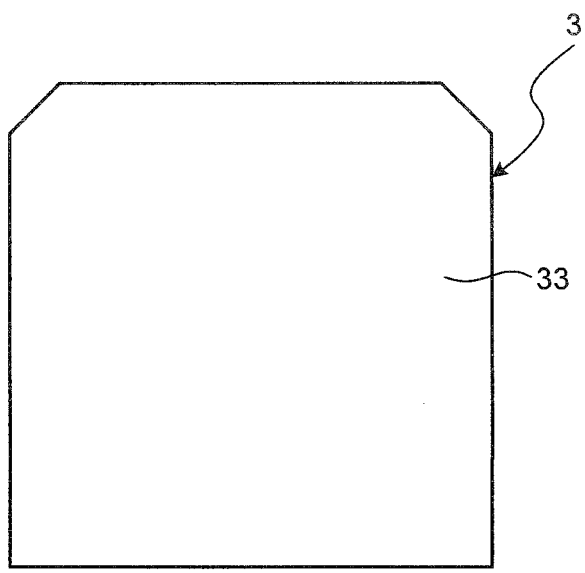
FIG. 3 is a side view of a light incident surface of a prism of the first embodiment.
Figure 4:
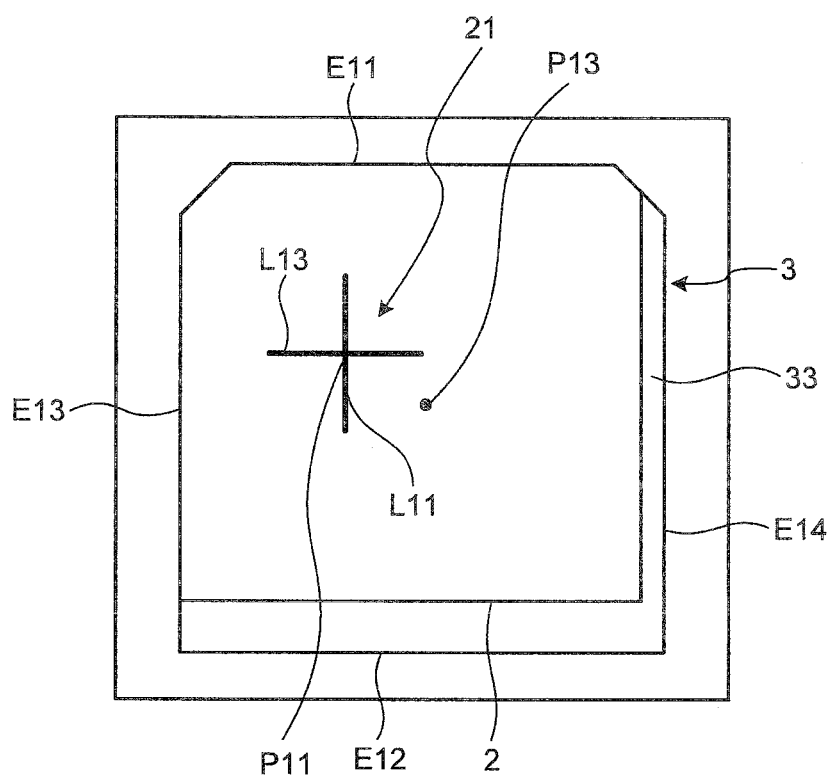
FIG. 4 is a diagram illustrating a principle of alignment on the substrate and the prism in the first embodiment.

The principle of alignment on the substrate 2 and the prism 3 performed by the mounting apparatus 1 according to the first embodiment will be described below. FIG. 2 is a plane view of the substrate 2 that is placed on the stage 11. FIG. 3 is a side view of the light incident surface 33 of the prism 3. FIG. 4 is a diagram illustrating the principle of alignment on the substrate 2 and the prism 3.

As depicted in FIG. 2, the substrate is rectangular and has a cross alignment mark 21 at the center of the top surface of the substrate 2. The alignment mark 21 consists of two lines L11 and L13 that are orthogonal to each other. For example, the alignment mark 21 is provided such that the intersection point P11 of the lines L11 and L13 coincides with the mounting target position, for mounting the prism 3, on the top surface of the substrate 2 and that each of the lines L11 and L13 is parallel to the edge of the substrate 2. The light incident surface 33 of the prism 3 has an approximately rectangular outline obtained by cutting the upper two corners of a rectangle as depicted in FIG. 3.

In the mounting apparatus 1 having the above-described configuration, illumination light emitted from the light source unit 13 is incident on the light incident surface 33 of the prism 3 via the optical path splitter 14, is reflected by the reflecting surface 35, and goes out from the light going-out surface 31. The illumination light then illuminates the substrate 2 on the stage 11 that is positioned beneath the light going-out surface 31 of the prism 3. The illumination light is reflected as reflection light from the side of the substrate 2, is incident on the imaging unit 15 via the prism 3 and the optical path splitter 14, and captured as an image by the camera 151 in the imaging unit 15. In this manner, when illumination light enters the prism 3 from the side of the light incident surface 33 and an image of the light incident surface 33 is captured, the outline of the light incident surface 33 of the prism 3 is on the resulting image data. In addition, the alignment mark 21 on the substrate 2, which is positioned beneath the light going-out surface 31 of the prism 3, is in an inner area of the prism 3 on the resulting image data.

Even if capturing an image of the transparent prism 3 (the reflection surface 35) from above is attempted for alignment employing the conventional technology disclosed in Japanese Laid-open Patent Publication No. 7-273497, the top surface of the prism 3 (the surface opposite to the reflection surface 35) does not transmit light and thus an image of the substrate 2 beneath the light going-out surface 31 cannot be captured from above the prism 3.

The mounting apparatus 1 according the first embodiment recognizes the alignment mark 21 on the image data by performing an image recognition process on the image data, which is captured as described above, and then calculates the position of the intersection point P11 of the recognized alignment mark 21 on the image data. In addition, the mounting apparatus 1 recognizes the outline of the light incident surface 33 of the prism 3 on the image data by performing an image recognition process on the image data, which is captured by the camera 151, and then calculates the position of the center P13 of the light incident surface 33 on the image data according to the recognized outline of the light incident surface 33. The mounting apparatus 1 controls the moving amount by which the stage 11 is moved such that the position of the intersection point P11 and the position of the center P13, which are calculated, coincide with each other.

Figure 5:
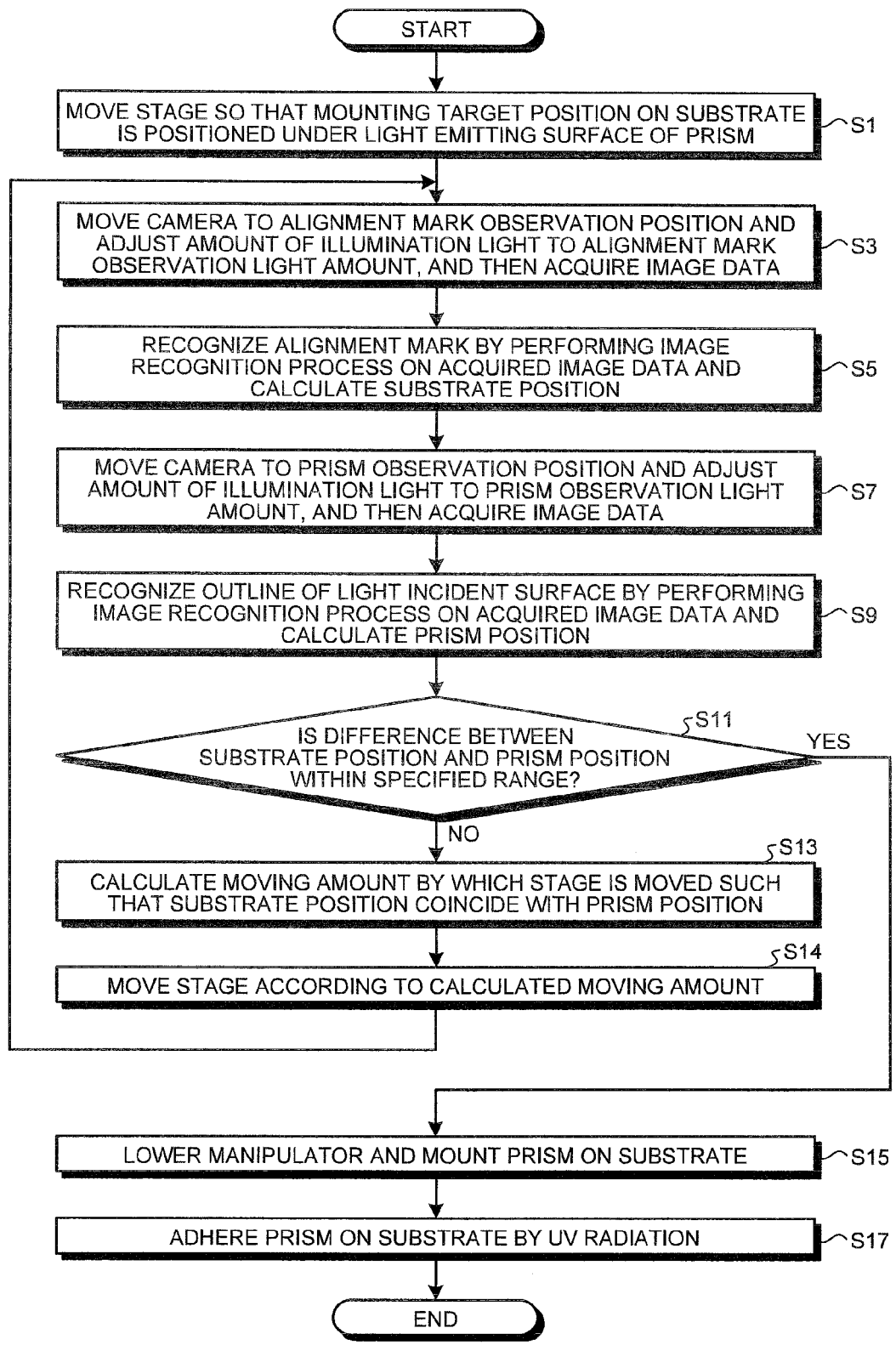
FIG. 5 is a flowchart of a procedure in which the mounting apparatus of the first embodiment mounts the prism on the substrate.

Specific operations of each unit of the mounting apparatus 1 will be described below. FIG. 5 is a flowchart of a procedure of mounting of the prism 3 on the substrate 2 by the mounting apparatus 1 of the first embodiment.

As illustrated in FIG. 5, first, the stage control unit 161 moves the stage 11 so that the alignment mark 21 (the mounting target position) on the substrate 2 is positioned under the light going-out surface 31 of the prism 3, which is held by the manipulator 12 (step S1).

Figure 6:
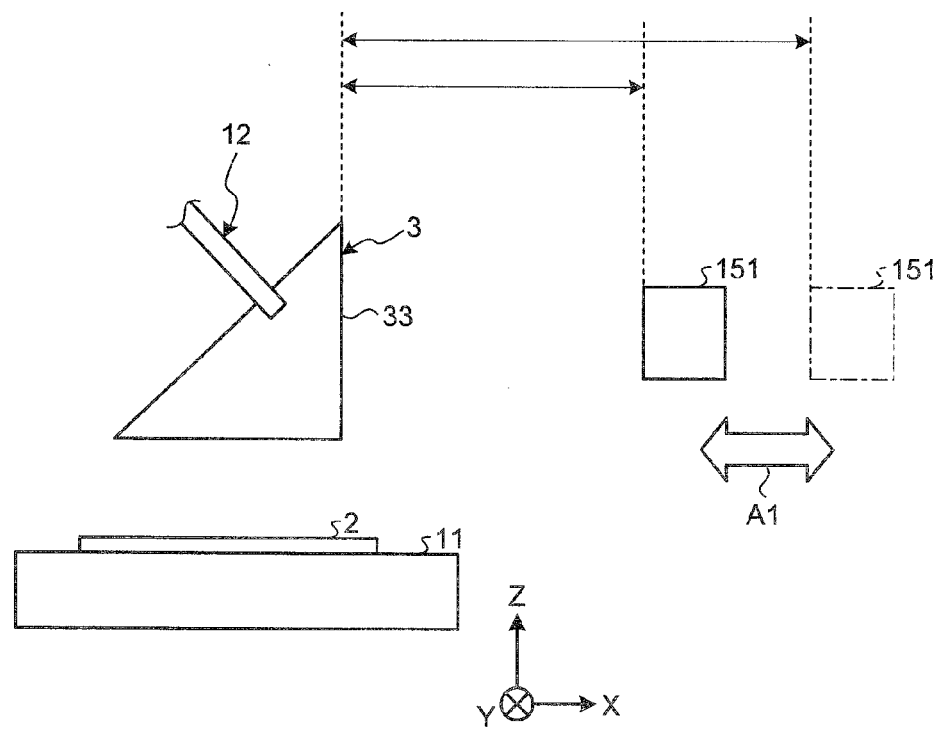
FIG. 6 is an illustration diagram illustrating an alignment mark observation position and a prism observation position of a camera.

Thereafter, image data that is captured by the camera 151 of the imaging unit 15 is acquired. In the first embodiment, image data is acquired with the X position of the camera 151 being different between when the alignment mark 21 is recognized (in the alignment mark recognition) and when the outline of the light incident surface 33 of the prism 3 is recognized (in the prism recognition). FIG. 6 is an illustration diagram illustrating the X position of the camera 151 in the alignment mark recognition (an alignment mark observation position) and the X position of the camera 151 in the prism recognition (a prism observation position). FIG. 6 represents the positional relationship between the prism 3 and the camera 151 in the respective positions. As represented by arrow A1 in FIG. 6, the camera 151 is displaced by the camera position adjustment device under the control of the control unit 16 and acquires image data by capturing an image with the distance, from the light incident surface 33 of the prism 3 to the camera 151, being different between the alignment mark recognition and the prism recognition.

The alignment mark observation position is an X position of the camera 151 that is set such that focus is on the alignment mark 21. The alignment mark observation position is obtained and stored beforehand in the storage unit 17. The prism observation position is an X position of the camera 151 that is set such that the focus is on the light incident surface 33 of the prism 3. The prism observation position is obtained and stored beforehand in the storage unit 17. In the alignment mark observation position, the camera 151 can obtain image data suitable for the image recognition process for the alignment mark 21. In the prism observation position, the camera 151 can obtain image data suitable for performing the image recognition process for the outline of the light incident surface 33 of the prism 3. The configuration in which the camera 151 is moved is described above. Alternatively, a configuration may be employed in which the lens is moved to adjust the focus according to an object for which the image recognition process is to be performed.

More specifically, in the first embodiment, the amount of illumination light can be also varied between in the alignment mark recognition and in the prism recognition. Specifically, the amount of illumination light suitable for capturing an image of the alignment mark 21 (alignment mark observation light amount) and the amount of illumination light suitable for capturing an image of the light incident surface 33 of the prism 3 (prism observation light amount) are obtained and stored beforehand in the storage unit 17. Under the control of the control unit 16, the light source unit 13 emits illumination light that is different in amount between in the alignment mark recognition and in the prism recognition. Accordingly, in the alignment mark recognition, image data with brightness suitable for the image recognition process for the alignment mark 21 can be obtained. In the prism recognition, image data with brightness suitable for the image recognition process for the outline of the light incident surface 33 of the prism 3 can be obtained.

The description on the operation will be continued using FIG. 5. Following step S1, the control unit 16 drives the imaging unit 15 to move the camera 151 to the alignment mark observation position and drives the light source unit 13 to adjust the amount of illumination light to the alignment mark observation light amount, and then the control unit 16 acquires image data using the camera 151 (step S3). The image processor 163 then recognizes the alignment mark 21 by performing the image recognition process on the acquired image data and calculates a substrate position (step S5). Specifically, a mark pattern image of the alignment mark 21 is prepared and stored beforehand in the storage unit 17. The image processor 163 recognizes the alignment mark 21 on the acquired image data by matching using the mark pattern. The image processor 163 calculates, as the substrate position, the position of the intersection point P11 of the recognized alignment mark 21 on the image data.

The control unit 16 moves the camera 151 to the prism observation position by driving the imaging unit 15 and adjusts the amount of illumination light to the prism observation light amount by driving the light source unit 13, and then the control unit 16 acquires image data using the camera 151 (step S7). The image processor 163 then recognizes the outline of the light incident surface 33 of the prism 3 by performing the image recognition process on the acquired image data and calculates a prism position (step S9). Specifically, an outline pattern image of the light incident surface 33 of the prism 3 is prepared and stored beforehand in the storage unit 17. The image processor 163 recognizes the outline of the light incident surface 33 of the prism 3 on the acquired image data by matching using the outline pattern. The image processor 163 calculates, as the prism position, the position of the center of the light incident surface 33 on the image data according to the recognized outline of the light incident surface 33.

The control unit 16 then determines whether the difference between the calculated substrate position and the prism position is within a specified range. If the difference is not within the specified range (NO at step S11), the control unit 16 calculates, according to the difference between the substrate position and the prism position, the moving amount by which the stage 11 is moved such that the substrate position coincides with the prism position (step S13). Thereafter, the stage controller 161 controls the movement of the stage 11 according to the calculated moving amount (step S14) and returns to step S3. The process of steps S3 to S14 is repeated in which the stage 11 is moved on the X-Y plane while it is determined whether the difference between the substrate position and the prism position is within the specified range. Accordingly, the position of the substrate 2 is adjusted with respect to the position of the prism 3 and the substrate 2 is aligned with the prism 3.

If the difference between the substrate position and the prism position is within the specified range (YES at step S11), the manipulator control unit 162 lowers the manipulator 12 and mounts the prism 3 on the substrate 2 (step S15). Thereafter, the contact portion between the substrate 2 and the prism 3 is irradiated with ultraviolet rays to adhere the prism 3 on the substrate 2 (step S17) and the process ends. An adhesive may be applied to the substrate beforehand or may be applied after the prism 3 is mounted on the substrate 2.

As described above, according to the first embodiment, the imaging unit 15 can be arranged on the side of the light incident surface 33 of the prism 3. The alignment mark 21 on the image data is recognized by performing the image recognition process on the image data, which is captured by the camera 151 of the imaging unit 15, and the position of the intersection point P11 of the alignment mark 21 on the image data can be calculated as the substrate position. The outline of the light incident surface 33 of the prism 3 on the image data is recognized by performing the image recognition process on the image data, which is captured by the camera 151, and the position of the center of the light incident surface 33 on the image data can be calculated as the prism position according to the recognized outline of the light incident surface 33. The moving amount by which the stage 11 is moved can be controlled such that the calculated substrate position coincides with the prism position. Accordingly, the prism 3 that refracts and sends out incident light can be aligned accurately and then can be mounted on the substrate 2. Because no complicated configuration is required, the mounting apparatus 1 can be realized easily at low cost.

In the first embodiment, the case is descried in which the substrate position and the prism position are calculated by performing the image recognition process on the image data and the substrate 2 and the prism 3 are aligned by controlling the moving amount, by which the stage 11 is moved, according to the difference between the substrate position and the prism position. Alternatively, the orientation of each of the substrate 2 and the prism 3 may be adjusted by controlling the rotation amount by which the stage 11 is rotated.

In this case, for example, the gradient of each of the lines L11 and L13 of the recognized alignment mark 21 in FIG. 4 is calculated and the gradient of each of upper, lower, right, and left edges E11 to E14 of the light incident surface 33 in FIG. 4 is calculated according to the outline of the light incident surface 33 of the recognized prism 3. In addition, the rotation amount by which the stage 11 is rotated is calculated such that the calculated gradient of the line L13 coincides with the gradient of the upper edge E11 or the lower edge E12, or such that the rotation amount by which the stage 11 is rotated is calculated such that the calculated gradient of the line L11 coincides with the gradient of the side edge E13 or E14. Thereafter, the rotation of the stage 11 is controlled according to the calculated rotation amount and the orientation of the substrate 2 with respect to that of the prism 3 is adjusted.

Specifically, for example, similar to the case of the adjustment of the position of the substrate 2 with respect to that of the prism 3, which is described in the first embodiment, the stage 11 is rotated on the X-Y plane while it is determined whether the difference between the gradients is within a preset specified value. Accordingly, the orientation of the substrate 2 is adjusted to be aligned with the orientation of the prism 3 so that the orientation of the substrate 2 with respect to that of the prism 3 is adjusted. The orientation of the substrate 2 with respect to that of the prism 3 can be adjusted in addition to the position of the substrate 2 with respect to that of the prism 3, and accordingly the prism 3 can be mounted on the substrate accurately.

In the first embodiment, the case is illustrated in which the alignment mark is provided in the mounting target position on the substrate 2. However, the present invention is not limited to this. For example, there is a case in which a prism is mounted on an imaging device that is mounted on a substrate. In such a case, the imaging surface of the imaging device, which is on image data, may be recognized and then alignment may be performed using the center of the recognized imaging surface as a mounting target position.

Figure 7:
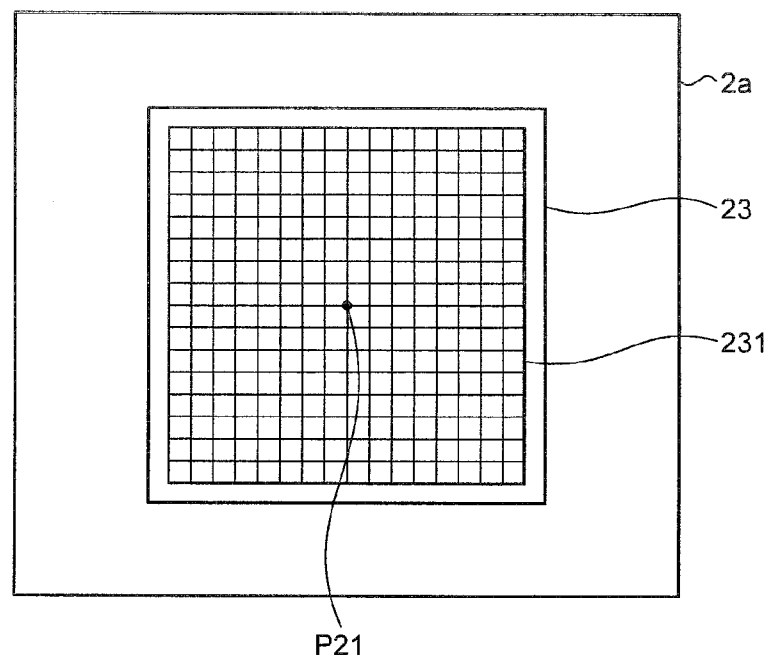
FIG. 7 is a plane view of a substrate that is placed on a stage in a modification.
Figure 8:
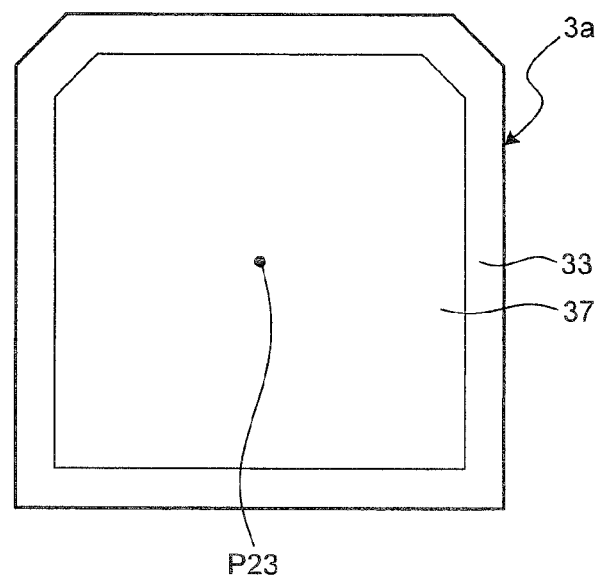
FIG. 8 is a side view of a light incident surface of a prism of a modification.
Figure 9:
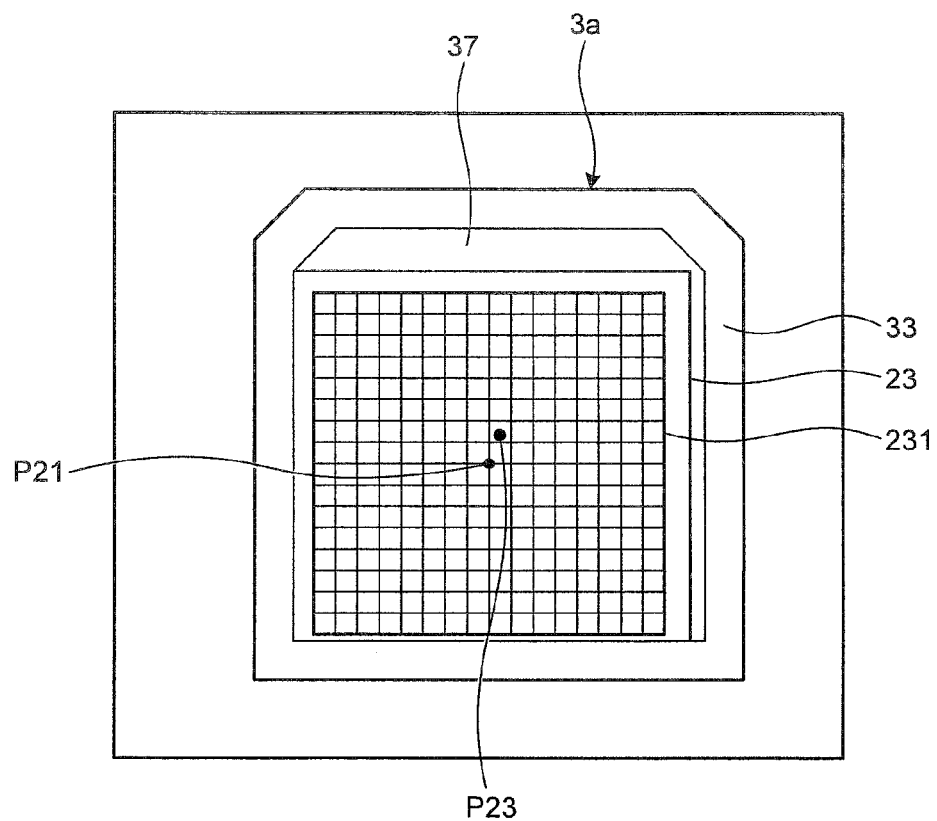
FIG. 9 is a diagram illustrating a principle of alignment on the substrate and the prism in the modification.

FIG. 7 is a plane view of a substrate 2a that is placed on the stage 11 of the mounting apparatus 1 of a modification. FIG. 8 is a side view of the light incident surface 33 of a prism 3a. FIG. 9 is a diagram illustrating the principle of alignment on the substrate 2a and the prism 3a.

As illustrated in FIG. 7, the substrate 2a is, for example, rectangular. The substrate 2a has a configuration in which an imaging device 23, such as a CCD or a CMOS, is mounted on the center of the top surface of the substrate 2a. The imaging device 23 having an imaging surface 231, which is an effective imaging area and in which pixels are arranged in matrix, as the top surface of the imaging device 23 is mounted on the top surface of the substrate 2a. In contrast, the light incident surface 33 of the prism 3a is similar to that of the first embodiment and has an approximately rectangular outline obtained by cutting the upper two corners of a rectangle as depicted in FIG. 8. The light incident surface 33 of the prism 3a has an effective area 37 and serves as an area that transmits light from the point of view of optical designing. However, in designing the prism 3a, the effective area 37 is defined on the drawing within a predetermined distance from the edge of the outline of the light incident surface 33 and thus the border that defines the effective area 37 of the prism 3a, which is manufactured according to the drawing, cannot be confirmed from the appearance of the prism 3a. In general, the center of the outline of the light incident surface 33 of the prism 3a coincides with the center of the effective area 37; therefore, the center of the effective area 37 is obtained by recognizing the outline of the prism 3a (the outline of the light incident surface 33).

In the modification, the mounting apparatus 1 recognizes the outline of the imaging surface 231 of the imaging device 23 on the substrate 2a on the image data, which is captured by the camera 151, by performing the image recognition process on the image data and then calculates the position of a center P21 of the recognized imaging surface 231 on the image data as depicted in FIG. 9. The mounting apparatus 1 recognizes the outline of the light incident surface 33 of the prism 3a on the image data, which is captured by the camera 151, by performing the image recognition process on the image data and then calculates the position of an outline center P23 of the light incident surface 33. The mounting apparatus 1 controls the moving amount by which the stage 11 is moved such that the calculated position of the center P21 of the imaging surface 231 coincides with the position of the outline center P23 of the light incident surface 33 of the prism 3a (in other words, the center of the effective area 37).

When the outline center position of the prism 3a differs from the center position of the effective area 37 on the light incident surface 33 of the prism 3a, the outline of the prism 3a is recognized in order to make the center of the effective area 37 and the center P21 of the imaging surface 231 coincide with each other. As described above, the effective area 37 of the light incident surface 33 is defined in designing the prism 3a. Thus, the center of the effective area 37 is obtained by calculating the position of the border, which defines the effective area, according to the defined information and the recognized outline of the prism 3a. It is satisfactory if the moving amount by which the stage 11 is moved is controlled such that the position of the obtained center of the effective area 37 coincides with the position of the center P21 of the imaging surface 231.

According to the modification, effects similar to those of the first embodiment can be obtained. In addition, the position of the substrate 2a with respect to that of the prism 3a is adjusted using, as the mounting target position, the center of the imaging surface 231 of the imaging device 23 that is mounted on the substrate 2a, and thus the substrate 2a and the prism 3a can be aligned with each other.

Second Embodiment

Figure 10:
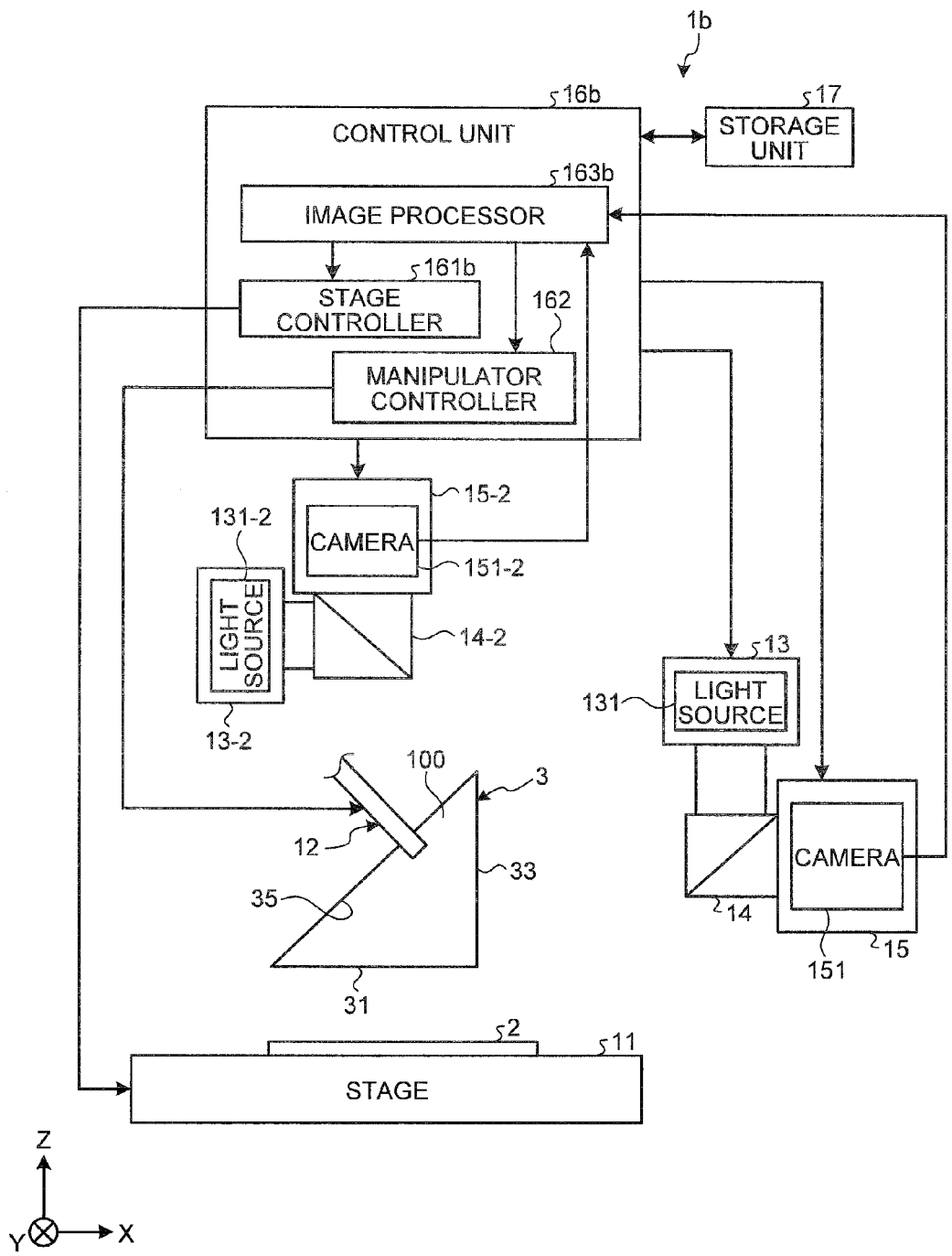
FIG. 10 is a schematic diagram illustrating an overall configuration of a mounting apparatus of a second embodiment of the present invention.

FIG. 10 is a schematic diagram illustrating an overall configuration of a mounting apparatus 1b of a second embodiment of the present invention. Parts like those of the first embodiment are denoted by like reference numerals. As illustrated in FIG. 10, the mounting apparatus 1b includes a light source unit 13-2 including a light source 131-2, an optical path splitter 14-2, and an imaging unit 15-2 including a camera 151-2, which are arranged above the stage 11, in addition to the light source unit 13, the optical path splitter 14, and the imaging unit 15 for capturing an image of the light incident surface 33 of the prism 3. The optical unit 13-2, the optical path splitter 14-2, and the imaging unit 15-2 can be realized using a configuration like that of the light source unit 13, the optical path splitter 14, and the imaging unit 15.

The optical unit 13-2, the optical path splitter 14-2, and the imaging unit 15-2 are used for capturing an image of the prism 3 from the side of the top surface of the prism 3 (the surface opposite to the reflecting surface 35) and are arranged in appropriate positions such that the camera 151-2 of the imaging unit 15-2 is positioned above the prism 3 that is held by the manipulator 12.

In the mounting apparatus 1b, a control unit 16b includes a stage controller 161b, the manipulator controller 162, and an image processor 163b.

The operations of each unit of the mounting apparatus 1b will be described. In the second embodiment, in the mounting procedure described using FIG. 5, the mounting apparatus 1b captures an image of the substrate 2 and the prism 3 from side of the top surface of the prism 3 using the camera 151-2 after the mount target position on the substrate 2 on the stage 11 is positioned under the light going-out surface 31 of the prism 3 at step S1. The position of the substrate 2 with respect to that of the prism 3 is then adjusted roughly according to the acquired image data.

Specifically, first, the control unit 16b drives the imaging unit 15-2 and acquires image data that is captured by the camera 151-2. The image processor 163b then recognizes the outline of the top surface of the prism and the outline of the substrate 2 on the acquired image data by performing the image recognition process on the image data and thus calculates an amount of deviation between the substrate 2 and the prism 3. Thereafter, the stage controller 161b roughly adjusts the position of the substrate 2 with respect to that of the prism 3 by moving the substrate 2 according to the calculated deviation amount.

Figure 11:
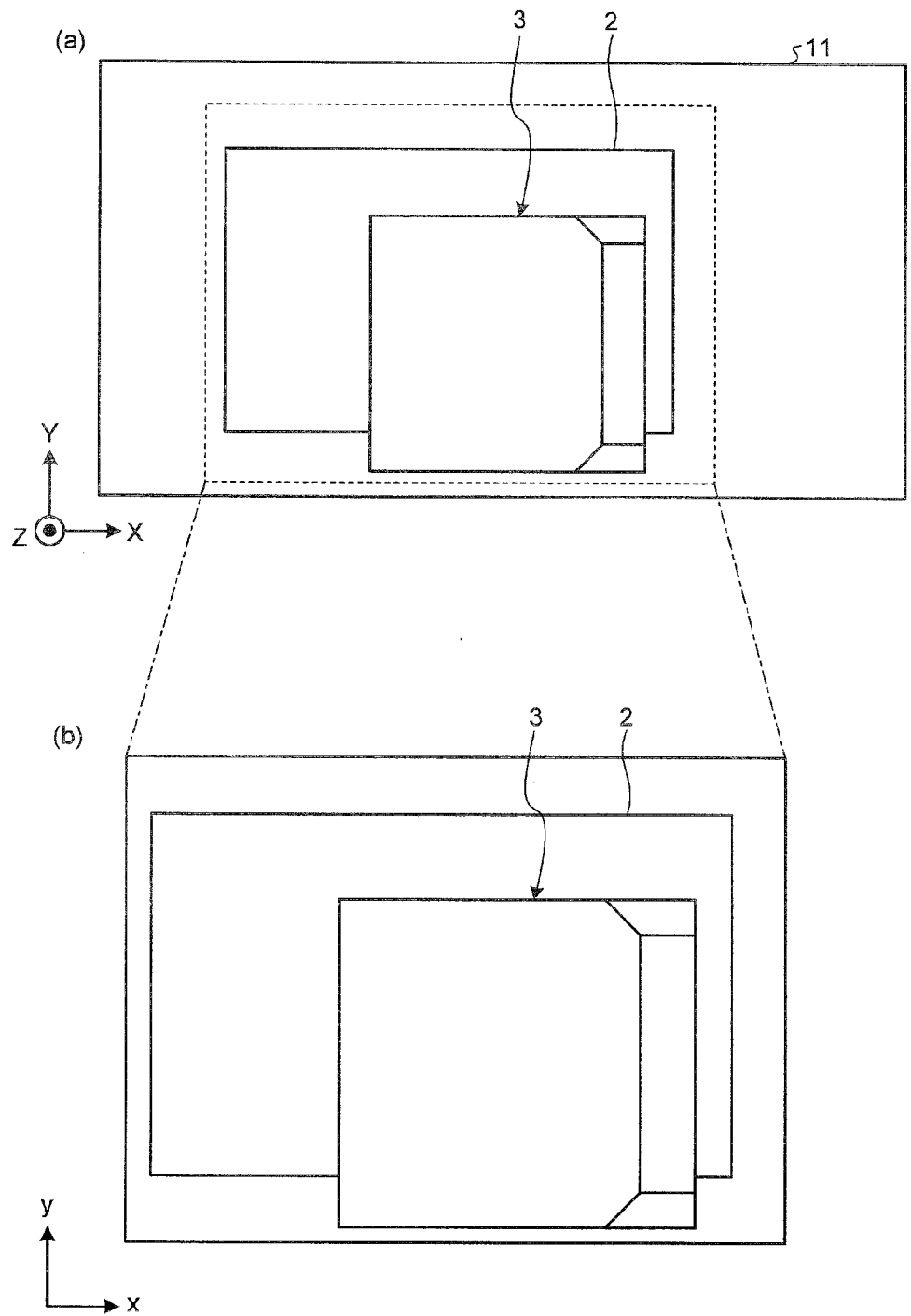
FIG. 11 is an illustration diagram of the relation between a coordinate system of a stage and a coordinate system of a camera that captures an image of a prism from the side of the top surface of the prism.

The relation between a coordinate system of the stage 11 and a coordinate system of the camera 151-2 of the imaging unit 15-2 and the relation between a coordinate system of the stage 11 and a coordinate system of the camera 151 of the imaging unit 15 will be described here. FIG. 11 is an illustration diagram illustrating the relation between the coordinate system of the stage 11 and the coordinate system of the camera 151-2. FIG. 11(a) depicts the top of the stage 11 looked down from above the prism 3 and FIG. 11(b) depicts an imaging area of which image is captured by the camera 151-2. As depicted in FIG. 11, the camera 151-2 is arranged such that the x-coordinate direction coincides with the X-axis direction of the stage 11 and the y-coordinate direction coincides with the Y-axis direction, and the camera 151-2 captures an image of the substrate 2 and the prism 3 from the side of the top surface of the prism 3.

FIG. 12 is an illustration diagram illustrating the relation between the coordinate system of the stage 11 and the coordinate system of the camera 151. FIG. 12(a) depicts the side of the stage 11 viewed from the side of the light incident surface 33 of the prism 3 and FIG. 12(b) depicts the imaging area of which image is captured by the camera 151. As depicted in FIG. 12, because the camera 151 captures an image of the substrate 2 via the prism 3, the x-coordinate direction corresponds to the Y-axis direction of the stage 11 and the y coordinate direction corresponds to the X-axis direction of the stage 11.

For this reason, when the moving amount by which the stage 11 is moved is calculated in the latter processing step (step S13 in FIG. 5), it is necessary to convert the coordinate system of the camera 151 to the coordinate system of the stage 11 and calculate the moving amount. This applies to the first embodiment.

The operations after the position of the substrate 2 is roughly adjusted with respect to that of the prism 3 according to the image data captured by the camera 151-2 are similar to those of the first embodiment. The substrate 2 and the prism 3 are aligned and the prism 3 is mounted on the substrate 2 according to the mounting procedure of steps S3 to S17, which are described above using FIG. 5.

As described above, according to the second embodiment, effects like those of the first embodiment can be obtained and an image of the substrate 2 and the prism 3 can be captured from the side of the top surface of the prism 3 using the camera 151-2 prior to the alignment of the substrate 2 and the prism 3. The position of the substrate 2 with respect to that of the prism 3 can be then roughly adjusted according to the acquired image data. Accordingly, the substrate 2 and the prism 3 can be aligned promptly and thus the time required for mounting can be shortened.

In the first and second embodiments, the prism 3 is illustrated in which the angle formed by the light going-out surface 31 and the light incident surface 33 is a right angle (90 degrees). In contrast, there is a case in which a prism in which the angle formed by a light going-out surface and a light incident surface is not a right angle is mounted on a substrate. For the case in which the prism having such a shape is mounted, a displacement unit may be provided that displaces the camera 151, which captures an image of the prism from the side of the light incident surface, by moving the camera 151 such that the optical axis of the camera 151 is aligned to an arbitrary direction. In this case, it is satisfactory if, in the alignment mark recognition, the camera 151 is displaced such that the angle formed by the optical axis and the reflecting surface coincides with the angle formed by the line orthogonal to the substrate 2 and the reflecting surface. In contrast, in the prism recognition, it is satisfactory if the camera 151 is displaced such that the optical axis orthogonally intersects with the light incident surface.

In the above-described first and second embodiments, the case in which the prism is mounted on the substrate is illustrated in the first and second embodiments. However, the disclosed technology is not limited to this. For example, the disclosed technology may be applied to a case in which other optical components, such as a mirror, that refracts incident light.

In the first and second embodiments, the configuration is described in which illumination light is applied from the side of the light incident surface 33 of the prism 3 and the illumination light that is reflected by the substrate 2 is captured as an image. In contrast, for example, when a prism is mounted on a transparent substrate, such as a glass substrate, illumination light may illuminate the substrate from below the substrate.

In the first and second embodiments, the case is described in which the position of the substrate 2 with respect to that of the prism 3 is adjusted by moving the stage 11 on the X-Y plane and thus the substrate 2 and the prism 3 are aligned. Alternatively, a configuration may be employed in which the manipulator 12 is moved instead of moving the stage 11, and the substrate 2 and the prism 3 are aligned by adjusting the position of the prism 3 with respect to that of the substrate 2. Alternatively, the substrate 2 and the prism 3 may be aligned in a way that the stage 11 and the manipulator 12 are moved in opposite directions, respectively, and thus the substrate 2 and the prism 3 moves relatively. The same applies to the case in which the orientations of the substrate 2 and the prism 3 are adjusted. A configuration may be employed in which the orientations of the substrate 2 and the prism 3 are adjusted in a way that any one of or both of the stage 11 and the manipulator 12 are rotated and thus the substrate 2 and the prism 3 rotate relatively.

According to one aspect of the present invention, a first surface of an optical component, on which light from a substrate is incident, is opposed to the substrate. In addition, an imaging unit is arranged in the optical path of light, which is emitted from a second surface of the optical component from which the light incident on the first surface is emitted after the light is reflected. Accordingly, an image of the substrate, which is opposed to the first surface, can be captured via the optical component from the side of the second surface of the optical component. The positions of the substrate and the optical component can be then adjusted according to image data that is captured by the imaging unit. Accordingly, the optical component that reflects the incident light and emits the incident light can be aligned accurately and then can be mounted on the substrate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mounting apparatus comprising:
a substrate;
a prism having a first surface on which light from the substrate is incident and a second surface from which the incident light goes out after the incident light is refracted;
an adjustment unit that adjusts a position of the substrate and a position of the prism by moving the substrate and the prism relatively with the first surface of the prism and the substrate being opposed to each other;
an imaging unit that is arranged in an optical path of the light that goes out from the second surface; and
a control unit configured to control an amount by which the adjustment unit moves the substrate and the prism relatively according to image data which is captured by the imaging unit so as to mount the prism on the substrate such that the first surface has contact with the substrate, wherein
the imaging unit captures an image of the second surface and captures an image of the substrate via the prism, the substrate being opposed to the first surface,
the control unit includes
a substrate recognition unit that recognizes at least a part of the image of the substrate which is captured via the prism, by performing an image recognition process on the image data, and
an optical component recognition unit that recognizes at least a part of the image of the second surface by performing an image recognition process on the image data, and
the control unit controls the amount by which the substrate and the prism are moved relatively, according to at least the part of the image of the substrate and at least the part of the image of the second surface.

2. The mounting apparatus according to claim 1, further comprising a light source unit that illuminates the second surface with illumination light, the light source unit being arranged such that an optical axis of the light source unit is identical with an optical axis of the imaging unit.

3. The mounting apparatus according to claim 1, wherein
the substrate has an alignment mark on a surface of the substrate opposed to the prism,
the substrate recognition unit recognizes the alignment mark contained in the image of the substrate which is captured via the prism,
the prism recognition unit recognizes an outline of the second surface, and
the control unit controls the amount by which the substrate and the prism are moved relatively such that a center position of the alignment mark and a center position of the second surface on the image data coincide with each other.

4. The mounting apparatus according to claim 3, wherein
the second surface has an effective area that serves as an area in which light is transmitted,
the prism recognition unit calculates a boarder which defines the effective area, by recognizing the outline of the second surface, and
the control unit sets a center position of the effective area as the center position of the second surface.

5. The mounting apparatus according to claim 1, wherein
the substrate is an imaging device that has an effective imaging area,
the substrate recognition unit recognizes an outline of the effective image area that is contained in an image of the imaging device, the image captured via the prism, the prism recognition unit recognizes an outline of the second surface, and the control unit controls the amount by which the imaging device and the prism are moved relatively such that a center position of the effective imaging area and a center position of the second surface coincide with each other.

6. The mounting apparatus according to claim 5, wherein the second surface has an effective area that serves as an area in which light is transmitted, the prism recognition unit calculates a boarder which defines the effective area, by recognizing the outline of the second surface, and the control unit sets a center position of the effective area as the center position of the second surface.

7. The mounting apparatus according to claim 1, wherein the imaging unit includes a lens and is configured to adjust the lens such that focus is on the first surface and the second surface 8. A mounting method comprising:

arranging a substrate and a first surface on which light from the substrate is incident so that the substrate and the first surface are opposed to each other, the first surface being of a prism having a second surface from which the incident light goes out after the incident light is refracted;

illuminating the second surface with illumination light;

capturing image data of the second surface;

controlling, according to the captured image data, an amount by which the substrate and the prism are moved relatively to adjust a position of the substrate and a position of the prism; and mounting the prism, whose position has been adjusted, on the substrate such that the first surface has contact with the substrate.

\* \* \* \* \*